(12) United States Patent
Calabro (10) Patent No.: US 7,840,143 B2
(45) Date of Patent: Nov. 23, 2010

(54) METHOD AND APPARATUS FOR DEMODULATING AN OPTICAL DIFFERENTIAL PHASE-SHIFT KEYING SIGNAL

(75) Inventor: Stefano Calabro, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 626 days.

(21) Appl. No.: 11/884,063

(22) PCT Filed: Feb. 8, 2006

(86) PCT No.: PCT/EP2006/050758
§ 371 (c)(1),
(2), (4) Date: Aug. 9, 2007

(87) PCT Pub. No.: WO2006/087283
PCT Pub. Date: Aug. 24, 2006

(65) Prior Publication Data
US 2008/0267637 A1 Oct. 30, 2008

(30) Foreign Application Priority Data
Feb. 18, 2005 (EP) .................. 05003562

(51) Int. Cl.
*H04B 10/00* (2006.01)
(52) U.S. Cl. ..................... 398/203; 398/206
(58) Field of Classification Search .......... 398/202–214
See application file for complete search history.

(56) References Cited

U.S. PATENT DOCUMENTS

| 5,319,438 | A | 6/1994 | Kiasaleh et al. | |
|---|---|---|---|---|
| 7,411,726 | B2 * | 8/2008 | Caplan | 359/325 |
| 2006/0093356 | A1 * | 5/2006 | Vereen et al. | 398/33 |
| 2008/0267637 | A1 * | 10/2008 | Calabro | 398/203 |

FOREIGN PATENT DOCUMENTS

GB  2 385 144 A  8/2003

OTHER PUBLICATIONS

Leib, H.: "Data-aided noncoherent demodulation of DPSK"; IEEE Transactions on Communications; IEEE Inc. New York; US; vol. 43; No. 2/4, part 2 Feb. 1995; pp. 722-725.
A. H. Gnauck and P. J. Winzer, "Phase-shift-keyed transmission", OFC 2004, Feb. 22-27, 2004, Los Angeles, California, USA, Tutorial TuF5.
Govind P. Agrawal, "Fiber-optic communication systems", Second Edition, New York: John Wiley & Sons, 1997, pp. 261-263.

(Continued)

*Primary Examiner*—Agustin Bello
(74) *Attorney, Agent, or Firm*—Laurence A. Greenberg; Werner H. Stemer; Ralph E. Locher (57) ABSTRACT

Demodulating an optical Differential Phase-Shift Keying (DPSK) signal is accomplished using a self-homodyne receiver for receiving the optical signal. A converter converts the optical signal received by the self-homodyne receiver into a representative electrical signal. A processor that processes the representative electrical signal using decision feedback multi-symbol detection in order to obtain a decision variable that indicates a differential phase-shift in the optical signal.

8 Claims, 6 Drawing Sheets

OTHER PUBLICATIONS

J.P. Gordon and L.F. Moellenauer, "Phase noise in photonic communications systems using linear amplifiers", Opt. Letters, vol. 15, Dec. 1990, pp. 1351-1353.

M. Rohde, C. Caspar, N. Heimes, M. Konitzer, E-J. Bachus, and N. Hanik, "Robustness of DPSK direct detection transmission format in standard fibre WDM systems", Electron Letters, vol. 36, No. 17, Aug. 2000, pp. 1483-1484, Abstract.

B. Spinnler et al., "Nonlinear tolerance of differential phase shift keying modulated signals reduced by XPM", OFC 2004, Feb. 22-27, 2004, Los Angeles, California, USA., Abstract.

Keang-Po Ho and Joseph M. Kahn, "Electronic Compensation Technique to Mitigate Nonlinear Phase Noise", IEEE Journal of Lightwave Technology, vol. 22, No. 3, Mar. 2004.

D. Divsalar and M.K. Simon, "Multiple-symbol differential dectection of MPSK", IEEEE Trans. Comm, vol. 38, No. 3,, pp. 300-308, Mar. 1990, Abstract.

F. Adachi and M. Sawahashi, "Decision feedback differential phase detection of M-ary DPSKsignals", IEEE Trans. Veh. Technol., vol. 44, pp. 203-210, May 1995, Abstract.

* cited by examiner

FIG 1 Probability distribution of the receive samples

FIG 2 Probability distribution of the receive samples

— Self-homodyne DBPSK
—*— Improved self-homodyne DBPSK w=0.8
—×— Improved self-homodyne DBPSK w=0.2
◇ Improved self-homodyne DBPSK w=0.9
—△— Improved self-homodyne DBPSK w=0.5
---□--- Homodyne DBPSK

FIG 7

— Self-homodyne
—*— Improved self-homodyne DQPSK w=0.8
—×— Improved self-homodyne DQPSK w=0.2
---◇--- Improved self-homodyne DQPSK w=0.9
—△— Improved self-homodyne DQPSK w=0.5
---□--- Homodyne DQPSK

FIG 8

- ─o─ Self-homodyne DBPSK
- ─*─ Improved self-homodyne DBPSK w=0.2
- ─△─ Improved self-homodyne DBPSK w=0.5
- ─*─ Improved self-homodyne DBPSK w=0.8
- ─◇─ Improved self-homodyne DBPSK w=0.9

FIG 9

- ─o─ Self-homodyne DQPSK
- ─*─ Improved self-homodyne DQPSK w=0.2
- ─△─ Improved self-homodyne DQPSK w=0.5
- ─*─ Improved self-homodyne DQPSK w=0.8
- ─◇─ Improved self-homodyne DQPSK w=0.9

METHOD AND APPARATUS FOR DEMODULATING AN OPTICAL DIFFERENTIAL PHASE-SHIFT KEYING SIGNAL

Differential phase-shift keying (DPSK) has recently been met with a rekindled interest from the optical community. A large number of experimental reports and theoretical works have been recently released. See, e.g., A. H. Gnauck and P. J. Winzer in their article, "*Phase-shift-keyed transmission*", *OFC* 2004, Feb. 22-27, 2004, Los Angeles, Calif., USA, Tutorial TuF5.

The reasons for this renewed interest include, amongst others, the relatively good receiver sensitivity that can be achieved using a DPSK network. DPSK also features an independency of the decision threshold from power fluctuations and is tolerant to optical filtering. In addition, DPSK boasts a robustness to nonlinearities, which make binary DPSK (DBPSK) particularly suited for long-haul applications and quaternary DPSK (DQPSK), DQPSK is particularly robust to fiber dispersion effects.

In brief, Phase-shift keying (PSK) is a method of digital communication in which the phase of a transmitted signal is varied to convey information. Differential phase-shift keying (DPSK) is Phase-shift keying that is used for digital transmission in which the phase of the carrier is discretely varied (a) in relation to the phase of the immediately preceding signal element and (b) in accordance with the data being transmitted. The classic demodulation techniques for DPSK can be classified into three main groups: homodyne, self-homodyne, and heterodyne.

In theory, optimal demodulation of a DPSK signal may be achieved with homodyne demodulation. Homodyne demodulation uses a local oscillator at the receiver and requires carrier-phase and polarization tracking. It is suggested that this works particularly well because the mixing efficiency is polarization-dependent.

However, the homodyne technique is relatively complex, and is in practice not employed. Instead, the common practice today is to resort to using a sub-optimal demodulation technique. One common practice is to use an interferometric technique, also known as self-homodyne demodulation, in which an interferometric discriminator replaces the phase reference of the local oscillator with the signal received during the previous symbol interval.

When the only channel impairment is represented by additive white Gaussian noise (AWGN), interferometric discrimination of DBPSK suffers only from a slight penalty in comparison with homodyne demodulation. However, in the presence of phase noise the penalty increases significantly. Moreover, interferometric discrimination of DQPSK and, in general, of multiphase DPSK, is largely suboptimal even in the case of pure AWGN channels.

The last demodulation technique mentioned, Heterodyne demodulation, is widely employed in wireless communications. Heterodyne demodulation makes use of a local oscillator and, therefore, requires a polarization control circuit in the optics. Unlike the homodyne technique, however, Heterodyne demodulation does not need carrier-phase tracking. The offset between carrier and local reference is removed by implementing differential detection in baseband through suitable complex algebra. In case of an ideal realization the performance is equivalent to that of self-homodyne, even though the complexity is significantly higher.

In summary, homodyne demodulation offers optimal performance at the price of high complexity. Self-homodyne demodulation allows a feasible implementation at the price of a significant performance penalty for DQPSK and also for DBSPK when phase noise is present. Heterodyne demodulation does not seem to suit the peculiarities of optical transmission systems.

The considerations above clearly indicate the need for a novel detection technique. A technique is needed that approaches the optimal performance of homodyne demodulation without requiring a local oscillator and the related complexity.

A possible approach that appears to be promising is to improve the performance of the self-homodyne detector, at least for the case of DBPSK, by mitigating the phase noise. In an optical system, phase noise may have many possible origins. The dominant mechanism depends on the envisaged application. For low transmission rate systems, G. P. Agrawal teaches in his article "*Fiber-optic communication systems*", *Second Edition*, New York: John Wiley & Sons, 1997, pp. 261-263, that the laser phase noise represents a critical issue. On the other hand, J. P. Gordon and L. F. Mollenauer show in their article "*Phase noise in photonic communications systems using linear amplifiers*", *Opt. Lett.*, vol. 15, pp. 1351-1353, December 1990, that self-phase and cross-phase nonlinear phase noise is known to be a limiting effect for DPSK in ultra-long haul (ULH) systems. On the other hand, XPM-induced phase noise can have a disastrous impact when installed OOK systems are upgraded with phase-shift keying modulation formats as illustrated by either M. Rohde, C. Casper, N. Heimes, M. Konitzer, E.-J. Bachus, and N. Hanik, "*Robustness of DPSK direct detection transmission format in standard fibre WDM systems*", *Electron. Lett*. vol. 36, no. 17, August 2000, pp. 1483-4, or B. Spinnler, N. Hecker-Denschlag, S. Calabrò, M. Herz, C.-J. Weiske, E.-D. Schmidt, D. van den Borne, G.-D. Khoe, H. de Waardt, R. Griffin, and S. Wadsworth, "*Nonlinear tolerance of differential phase-shift keying modulated signals reduced by XPM*", *OFC* 2004, Feb. 22-27, 2004, Los Angeles, Calif., USA.

In the optical literature, only the mitigation of self-phase nonlinear phase noise has drawn considerable attention. Cited for example are X. Liu, X. Wei, R. E. Slusher, and C. J. McKinstrie, "*Improving transmission performance in differential phase-shift-keyed systems by use of lumped nonlinear phase-shift compensation*", *Opt. Lett.*, vol. 27, pp. 1616-1618, 2002; C. Xu and X. Liu, "*Postnonlinearity compensation with data-driven phase modulators in phase-shift keying transmission*", *Opt. Lett.* Vol. 27, pp. 1619-1621, 2002; and K.-P. Ho and J. M. Kahn, "*Electronic compensation technique to mitigate nonlinear phase noise*", *IEEE Journal of Lightwave Technology*, vol. 22, no. 3, March 2004.

The available solutions for mitigating self-phase nonlinear phase noise apply to a single channel scenario and rely on the fact that, for the considered case, the additive noise at the origin of the nonlinear phase noise also affects the intensity of the received signal. Under these conditions, larger phase rotations are observed in correspondence of higher instantaneous power of the noise and, therefore, of the signal. As a result, the received signal constellation is stretched along a spiral, as illustrated in FIG. 1 and FIG. 2.

Figure 1:
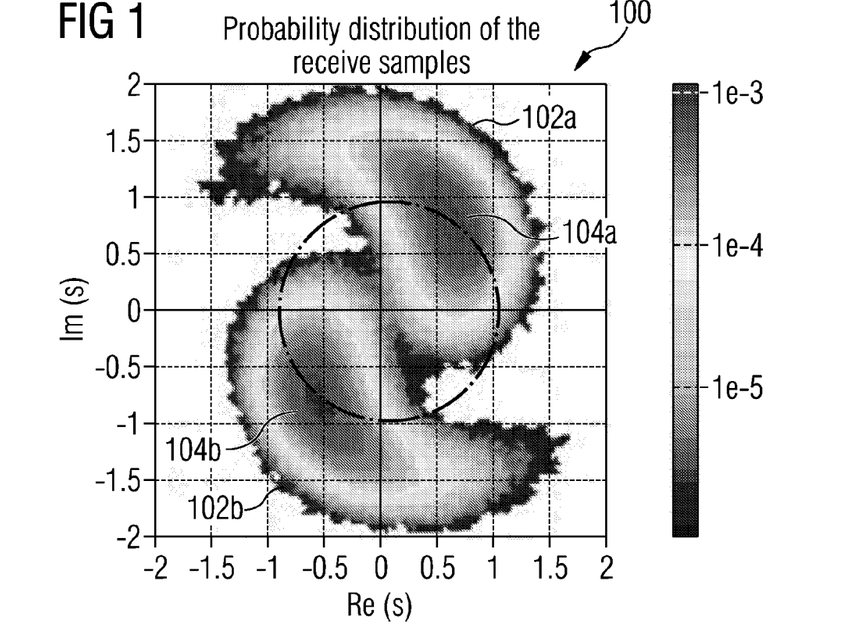
FIGS. 1 and 2 illustrate noise patterns of the prior art.
Figure 2:
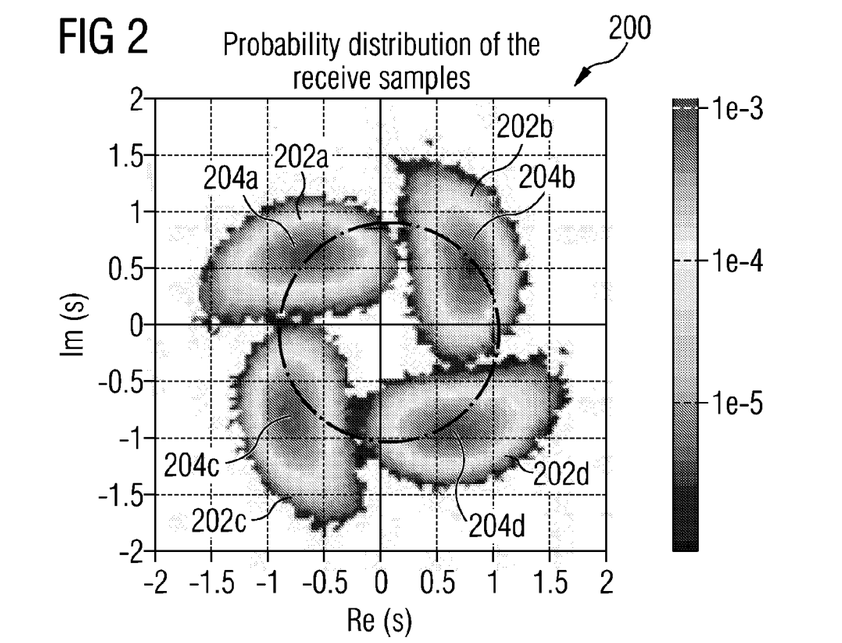

FIGS. 1 and 2 show the received signal constellation in the presence 100, 200 of self-phase nonlinear phase noise for DBPSK and DQPSK, respectively. The axes correspond to the in-phase and quadrature components of the received symbols, which are the real and imaginary parts in the equivalent low-pass domain. In absence of any channel impairment, the signals in the ideal world, without noise, result in two (four) small points for DBPSK (DQPSK), each point corresponding to a real and imaginary part.

Additive noise broadens these points to symmetrical "clouds" 102a, b (202a-d) as shown in the figures. Phase-noise stretches the clouds along a spiral. Since noise is a random process, FIGS. 1 and 2 represent the statistics of the received signal. The central portions 104a, b (204a-d) correspond to more likely points. The receiver recovers the transmitted bits on the basis of the received symbol. If the clouds are not well-separated, the error probability will be high.

The proposed mitigation methods counter-rotate the received constellation shown in FIGS. 1 and 2 by an angle that is proportional to the power of the received sample. The rotation can be performed either in the optical domain, as considered by Liu or Xu, or after detection, i.e., by electronic means, as described in Ho. In any case, the proportionality constant between counter-rotation and received power depends on the characteristics of the transmission channel and must be accurately set for any specific deployed system in order to achieve phase noise mitigation and not to cause additional disturbances. Further, the measurement of the signal power and the counter-rotation of the phase require high precision components.

However, these methods are ineffective against other types of phase noise than self-phase nonlinear phase noise as cross-phase nonlinear phase noise or XPM-induced phase noise, which do not exhibit a correlation between received power and phase rotation. Moreover they cannot reduce the inherent performance penalty of a DQPSK interferometric discriminator and therefore do not address the whole problem discussed by Gnauck. A different approach to mitigating the noise was set forth by the multi-symbol detection techniques introduced during the nineties for wireless and especially mobile communications applications such as that disclosed by D. Divsalar, M. K. Simon, "*Multiple-symbol differential detection of MPSK*", IEEE Trans. Comm., vol. 38, no. 3, pp. 300-308, 1990; F. Adachi and M. Sawahashi, "*Decision feedback differential phase detection of M-ary DPSK signals*", IEEE Trans. Veh. Technol., vol. 44, pp. 203-210, May 1995; or H. Leib, "*Data-aided noncoherent demodulation of DPSK*", IEEE Trans. Comm., vol. 43, no. 2/3/4, pp. 722-725, February/March/April 1995.

The basic idea disclosed by these last three articles is to generate a more stable reference phase by using the last N received symbols instead of the last symbol alone. Unfortunately, these techniques are based on a heterodyne structure and, therefore, imply a local oscillator with polarization control. Further, and although they can efficiently compensate random phase noise, by averaging it out, they suffer from a frequency offset between the signal carrier and the local oscillator. In fact, a frequency offset produces a deterministic phase rotation, which increases linearly with the distance between the considered symbols. This makes old symbols useless, if not harmful, for the recovery of a stable phase reference, thereby limiting the efficiency of the approach itself. In order to avoid this effect, the frequency offset between local oscillator and signal carrier must be controlled through a suitable circuit, which leads to additional complexity.

Amongst these latest mitigation efforts, perhaps only Lieb makes some sense. According to his recursive decision-feedback multi-symbol detection technique, as illustrated in FIG. 2 on page 724 of his article, the received signal r(t) is baseband-converted by means of a quadrature heterodyne receiver and then sampled at baud rate, giving rise to the sequence y(n). The conventional DPSK decision variable in Equation (1) of Lieb is reprinted here as follows, $$y(n)y^*(n-1). \tag{1}$$

Lieb proposes to replace the conventional DPSK decision variable above (1) by an improved variable in Equation (2), $$y(n)Z^*(n-1), \tag{2}$$

where (see equation (7) of Lieb)

$$Z(n-1)=w\exp[jc(n-1)]Z(n-2)+y(n-1). \tag{3}$$

Here $0 < w \leq 1$ and $c(n-1)$ are a forgetting factor and the estimated phase of the previous data symbol, respectively.

The essence of the method described by Lieb consists in replacing the previous symbol y(n−1) by the sum of y(n−1) and a term that depends recursively on the past received symbols. The factor exp[jc(n−1)] rotates the previous reference symbol Z(n−2) to align it with y(n−1), whereas the forgetting factor w limits the memory of the system by attenuating the effect of the old symbols respect to the last one. For w=0, we have the conventional heterodyne DPSK detection. As w increases, a longer averaging takes places and a better performance is achieved. For w=1 the detector has infinite memory and approaches the performance of a homodyne demodulator.

However, Lieb, although it is not clear from his article, is related to wireless solutions to demodulating received DPSK signals. As typical of the wireless technology, Lieb begins with a heterodyne receiver. As already mentioned, heterodyne multi-symbol detection is very sensitive to the frequency offset between signal carrier and local oscillator. In practice, no local oscillator can be set with a precise frequency.

In the present case, it is desired to demodulate an optical signal. However, frequency offset, such as that generated in wireless systems such as Lieb's, results in unsatisfactory phase error in optical solutions. The following demonstrates this quantitatively. Let us denote by a(n) the phase of the n-th transmit symbol and by $\Delta fT$ the frequency offset normalized to the signaling rate. In the absence of noise, Equation (4), $$y(n)y^*(n-1)=\exp[ja(n)]\exp[j2\pi\Delta fT], \tag{4}$$

holds. Unrolling the recursion, the decision variable can be expressed as $$y(n)Z^*(n-1) = y(n)\sum_{m=0}^{n-1} w^{n-1-m}\exp\left[-j\sum_{k=m+1}^{n-1} c(k)\right]y^*(m). \tag{5}$$

If we optimistically assume that all previous decisions are correct, i.e. c(k)=a(k) (k=0, 1, . . . , n−1), we obtain Equation (6):

$$y(n)Z^*(n-1) = \exp[ja(n)]\exp[j2\pi\Delta fT] \tag{6}$$

$$\sum_{m=0}^{n-1} w^{n-1-m}\exp[j2\pi(n-1-m)\Delta fT]$$

$$= \exp[ja(n)]\exp[j2\pi\Delta fT]\frac{1-w^n\exp[j2\pi n\Delta fT]}{1-w\exp[j2\pi\Delta fT]},$$

which in the steady state, as n→∞, and for w<1 becomes Equation (7):

$$y(n)Z^*(n-1) = \exp[ja(n)] \frac{\exp[j2\pi\Delta fT]}{1 - w\exp[j2\pi\Delta fT]}. \quad (7)$$

The second factor on the right side of the previous equation represents the disturbance due to the frequency offset. Plotting its phase as a function of the forgetting factor w we obtain the plot 300 for heterodyne decision-feedback for multi-symbol DPSK detection as shown in FIG. 3.

Figure 3:
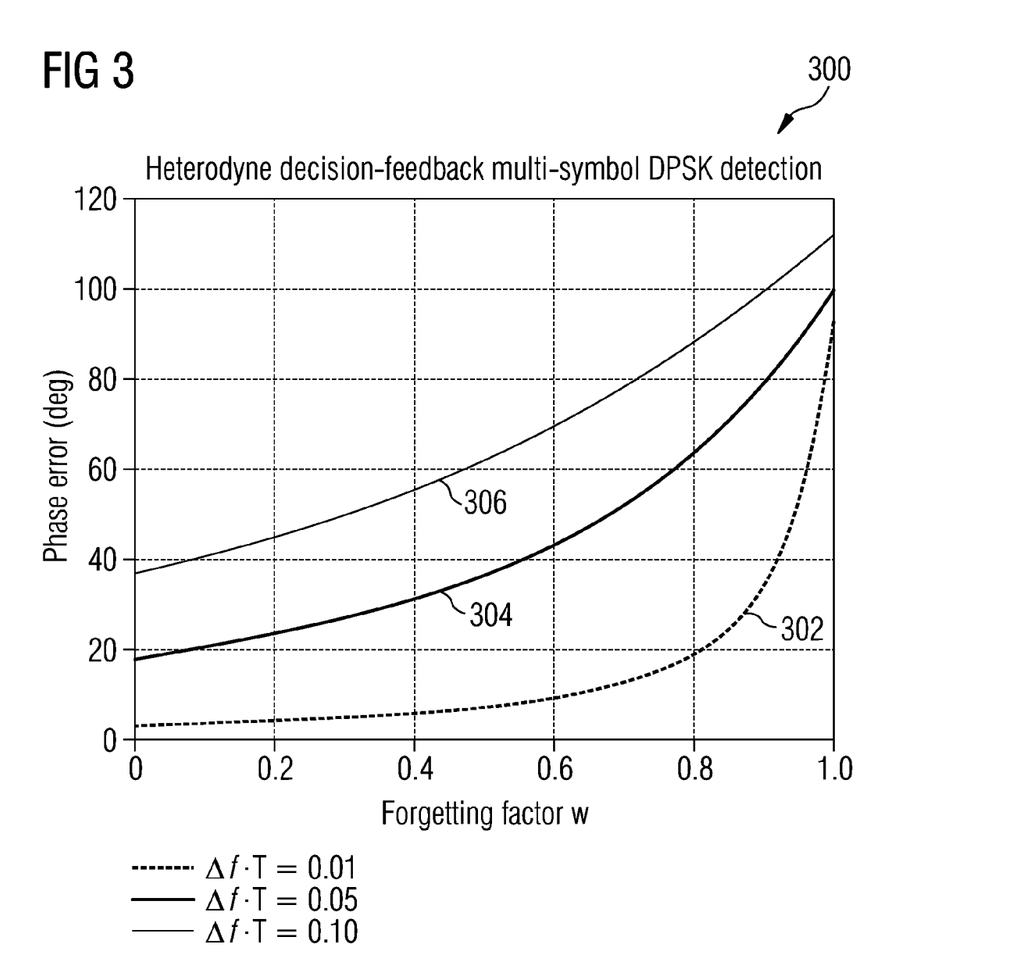
FIG. 3 illustrates the results in graph form of the prior art.

As shown in FIG. 3, there are plots 302, 304 and 306, respectively, each showing the plot for a different phase offset. In the case of plot 302, there is the case where the offset is 10 percent of the actual signal, 5 percent for plot 304 and 1 percent for plot 306. Assuming that we can tolerate a maximum phase error of 20 degrees, the maximal value of w is 0.8 for $\Delta fT=0.01$ (100 MHz at 10 Gb/s) and 0.1 for $\Delta fT=0.05$ (500 MHz at 10 Gb/s). For $\Delta fT=0.1$ (1 GHz at 10 Gb/s), we see from FIG. 3 that the penalty would be too large even when the forgetting factor is set to w=0, i.e., not taking into account even the previous decision variable. For optical systems, such a phase error is intolerable. It is apparent, therefore, that Lieb's solution is insufficient for optical solutions.

What is lacking in the art is the ability to achieve DPSK demodulation of an optical signal with high accuracy that does not suffer from the dilatory effects of frequency offset between the signal carrier and the local oscillator. What is needed is a DPSK demodulator that achieves high accuracy for an optics solution, yet is inexpensive and reduced in complexity.

SUMMARY OF THE INVENTION

Demodulating an optical Differential Phase-Shift Keying (DPSK) signal is accomplished using a self-homodyne receiver (402) for receiving the optical signal. A converter (404) converts the optical signal received by the self-homodyne receiver into a representative electrical signal. A processor (410) that processes the representative electrical signal using decision feedback multi-symbol detection in order to obtain a decision variable that indicates a differential phase-shift in the optical signal.

BRIEF DESCRIPTION OF THE DRAWINGS

FIG. 4 illustrates the present invention.

DETAILED DESCRIPTION OF THE PREFERRED EMBODIMENTS

According to the technique of the proposed invention, the disturbance attributed to frequency offset is avoided whilst achieving excellent performance characteristics. This is achieved in the present invention by applying a self-homodyne receiver for receiving the optical signal. Since self-homodyne receivers are not dependent on a local oscillator, the problem of frequency offset is avoided. In order to account for this new receiver applied at the front end of an optics demodulator, a unique post-processing apparatus and process was needed to be invented. That process in essence performs a comparison on the decision using a recursion technique, thereby producing an improved decision variable x(nT).

An exemplary implementation 400 of the invention shall now be described with reference to FIG. 4. The received signal r(t) is split into two portions and sent through an optical receiver, the self-homodyne receiver of the present invention. In one aspect of the invention, the self-homodyne receiver is comprised of an interferometric discriminator. In DPSK where demodulation involves the input signal be split into its real and imaginary parts and, in the exemplary case shown, the receiver is comprised of the pair of interferometric discriminators shown 402a, b.

The differential delay amounts to the signaling interval T, whereas the phase shift between upper and lower branches is set to $\Delta\phi=0$ and $\Delta\phi=\pi/2$ radians for the two interferometers, respectively.

If we denote the received optical signal r(t) by Equation (8):

$$r(t)=y_I(t)\cos 2\pi f_0 t - y_Q(t)\sin 2\pi f_0 t = Re\{y(t)\exp(j2\pi f_0 t)\}, \quad (8)$$

where $y(t)=y_I(t)+y_Q(t)$ is the complex envelope of r(t), it can be seen that the received signal comprises a real and imaginary part.

The interferometers separate the respective real and imaginary parts according to the phase shift set. Thereafter, the optical signal is converted into the electrical domain by, in this case, a pair of opto-electrical diodes 404a, and likewise 404b for the imaginary portion, and corresponding operational amplifier 406a, b. At this point, the real and imaginary parts are subjected to low-pass filtering using, for example, low pass filters 408a, b.

After interferometric balanced detection and low-pass filtering, the state of the art decision variable u(t) is, thus, attained. It can be observed that the decision variable u(t) is represented by its real and imaginary parts as illustrated in Equation (9), as follows:

$$\begin{cases} u_I(t) = Re\{y(t)y^*(t-T)\} & \text{out of the discriminator with } \Delta\varphi = 0 \\ u_Q(t) = Im\{y(t)y^*(t-T)\} & \text{out of the discriminator with } \Delta\varphi = \frac{\pi}{2}. \end{cases} \quad (9)$$

As mentioned above, the invention utilizes a self-homodyne receiver in order to avoid the degradation of the optical system due to frequency offset. The processing shown in Lieb would not work with such a front end receiver as proposed by the invention. In order to account for the self-homodyne receiver, then, the invention provides a unique post processing. Here, the processing of the invention generates an improved decision variable x(nT) based on u(nT). The processing by which the improved decision variable is generated will now be derived mathematically. In order to better compare the new and known decision variables, it is expedient to introduce n and $\tilde{t}$, such that:

$$t = nT + \tilde{t} \text{ with } -\frac{T}{2} \le \tilde{t} \le \frac{T}{2}. \quad (10)$$

and to define the decision variable u(nt) as:

$$u(nT+\tilde{t})=u_1(nT+\tilde{t})+ju_Q(nT+\tilde{t})=y(nT+\tilde{t})y^*[(n-1)T+\tilde{t}]. \quad (11)$$

Neglecting a possible immaterial time offset, we assume that the optimal decision instants occur at $\tilde{t}=0$. The conventional decision variable for the n-th transmit symbol is thus u(nT).

In terms of u(nT), the improved decision variable is presented here, which is defined according to the invention by the following recursive equation:

$$x(nT+\tilde{t})=u(nT+\tilde{t})+w\cdot u(nT+\tilde{t})\cdot x[(n-1)T+\tilde{t}]\cdot\exp[-jc(n-1)]. \quad (12)$$

The new decision variable x(nT) is defined as the sum of the conventional decision variable u(nT) and a second term, which depends on the product of u(nT) and x((n−1)T). In other words, x depends recursively on its past values. The second term further includes a phase correction factor exp(−jc(n−1)), which functions to align the first and second terms so that they combine constructively.

According to the notation already discussed with reference to the earlier Lieb solution, $0<w\leq 1$ and c(n−1) are a forgetting factor and the estimated phase of the previous data symbol, respectively. The forgetting factor w is a weight that controls the influence of the second term. If set w=0, the Equation 12 yields x=u and the receiver behaves as a conventional receiver. For w=1 the receiver has infinite memory and achieves excellent results according to the invention.

In order to explain the ratio behind the Formula in Equation (12) and to clarify its relationship with Lieb, we unroll the recursion above, obtaining Equation (13) as follows:

$$x(nT+\tilde{t}) = y(nT+\tilde{t}) \sum_{m=0}^{n-1}\left\{w^{n-1-m}\exp\left[-j\sum_{k=m+1}^{n-1}c(k)\right]y^*(mT+\tilde{t})\prod_{k=m+1}^{n-1}|y(kT+\tilde{t})|^2\right\}. \quad (13)$$

A comparison with Equation (5) reveals that, starting from a different input signal, i.e. u(t) instead of y(n), we obtain a similar decision variable. The first difference lies in the nature of y, which now cannot contain any frequency offset, since we employ interferometric detectors instead of a local oscillator. The second difference is due to the factor shown in Equation (14):

$$\prod_{k=m+1}^{n-1}|y(kT+\tilde{t})|^2, \quad (14)$$

which is located inside the summation in Equation (13). This represents an imperfection, whose exact compensation would require expensive processing at the symbol rate.

Of course, one could remove the factor (14), however this would require expensive modifications. Therefore, in another aspect of the invention, factor (14) is not removed. As a compromise, factor (14) may be instead compensated for by means of a conventional (i.e., slow) gain control. Of course, this compensation rectifies only the average effect of factor (14). However, simulations show that the resulting performance degradation using such a gain control is negligible.

Turning again to FIG. 4, Equation (12) is embodied in the electronic post-processing 410 provided between the low-pass filters and the decision devices. In the exemplary embodiment shown, the electronic post-processing 410 generates the second part of the expression in Equation (12) that is added to the decision variable u(t). Of course, other implementations embodying the processing may also be implemented.

Figure 4:
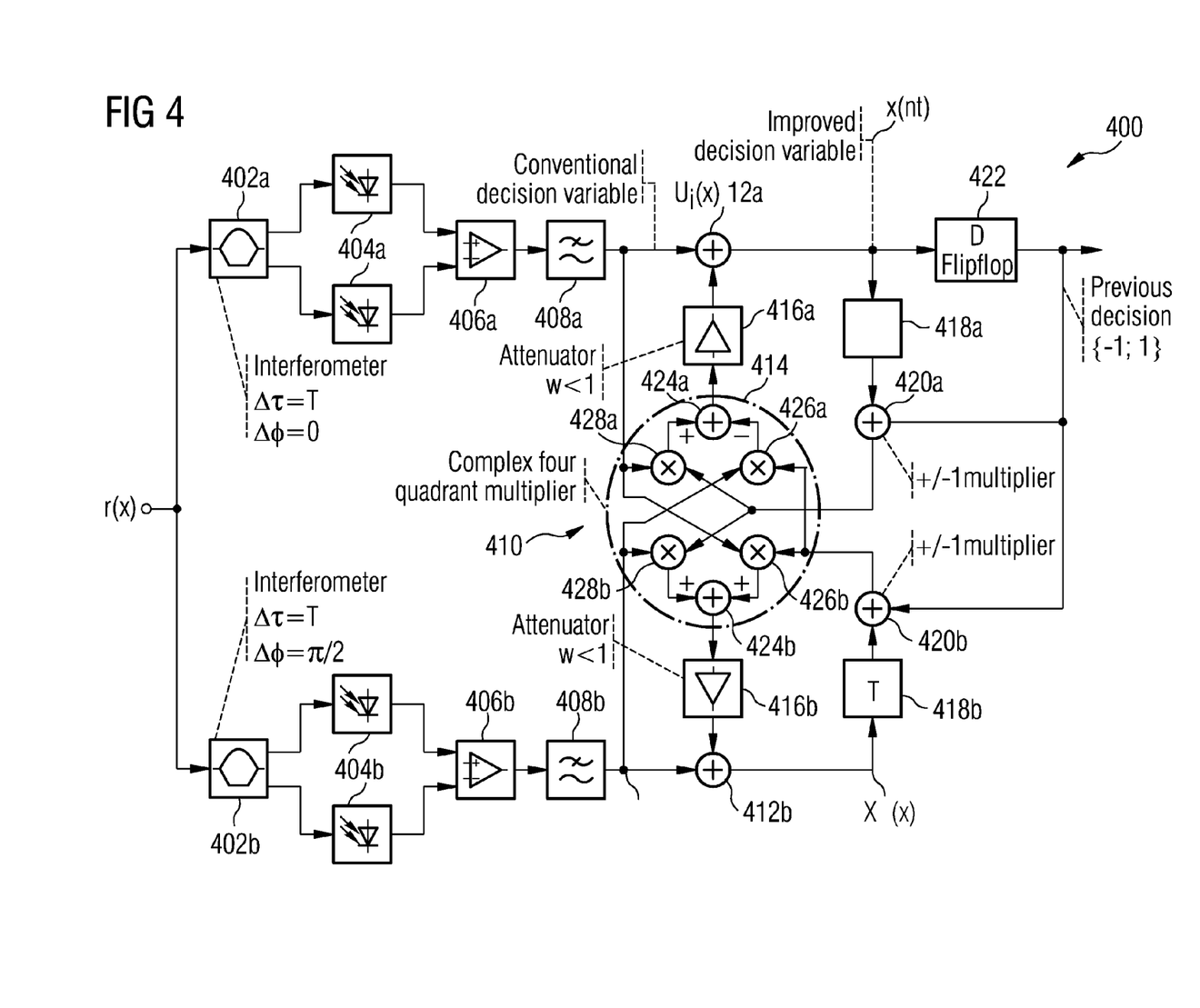

In FIG. 4, an adder 412a, b adds the decision variable and the second part of expression (12) together in order to obtain the improved decision variable x(t). In general, a processor is provided that samples the decision variable u(t) and factors it by a previously generated improved decision variable. The sign of the factor is dependent on the previous decision. In the present invention, a complex multiplier 414 is provided, such as a complex four quadrant multiplier, in order to multiply the complex numbers. An attenuator 416a, b provides the forgetting, or weighting, factor w, to attenuate the effect of the electronic processing.

The time delayed version of the improved decision variable is provided by sampling the improved decision variable x(t) by a time delay T 418a, b. The sign of the delayed version of the decision variable x(t) is provided by the exponent factor exp[−jc(n−1)]. The time delayed version of the decision variable x(t) and the exponent factor are combined by a multiplier 420a, b before the complex multiplier 414. Here, multiplier 420a, b is shown as a +/−1 multiplier.

The exponent factor in the exemplary figure shown corresponds directly to the output of the decision devices, i.e., there is no need for a special component to compute the factor here. For DBPSK, the exponent factor can take the two real values +/−1. For DQPSK, discussed later, it takes the four complex values (+/−1)+(+/−j).

The complex multiplier may be constructed as shown in FIG. 4 with an adder and a subtractor. This follows from the rules of complex algebra, which we shall not delve into here. Suffice to say that the complex four quadrant multiplier computes the product of the decision variable u(nT) and the improved decision variable factored by the phase x[(n−1)T]*exp[−jc(n−1)].

The particular complex four quadrant multiplier in FIG. 4, has 2 complex inputs (i.e. 4 real inputs) and one complex output (i.e. 2 real outputs). The output of the +/−1 multipliers 420a, b, namely the complex form of x[(n−1)T]*exp[−jc(n−1)], is factored by multipliers 428a, b and 426a, b, respectively, with the variable u(nT). The output of these multipliers is directed to the adders 424a, b, respectively. The weighting factor is then applied by attenuators 416a, b, respectively.

The improved decision variable is then sent to a decision device. As should be apparent from the literature, the decision variable is a variable or parameter input to the decision device whose value represents a phase or phase difference of the optical signal that is used in DPSK. The decision device in the exemplary apparatus shown in FIG. 4 as a D flip flop. Although, the decision device may be as simple as a switch or a more complex processor. Additional components utilized by the decision device, e.g., clock recovery, etc., are known and, therefore, have been omitted for clarity.

As mentioned, FIG. 4 illustrates the case for DBPSK. For binary DPSK is adopted and the decision feedback multi-symbol detection simplifies into:

$$x(nT+\tilde{t})=u(nT+\tilde{t})+w\cdot u(nT+\tilde{t})\cdot x[(n-1)T+\tilde{t}]\cdot c(n-1) \quad (15)$$

wherein the complex number u(t) is representative of the electrical signal converted by the converter, the real number w is a weighting factor, the real number c(n−1) is representative of the estimated previous data symbol and the real part of the complex number x(t) is the decision variable.

Figure 5:
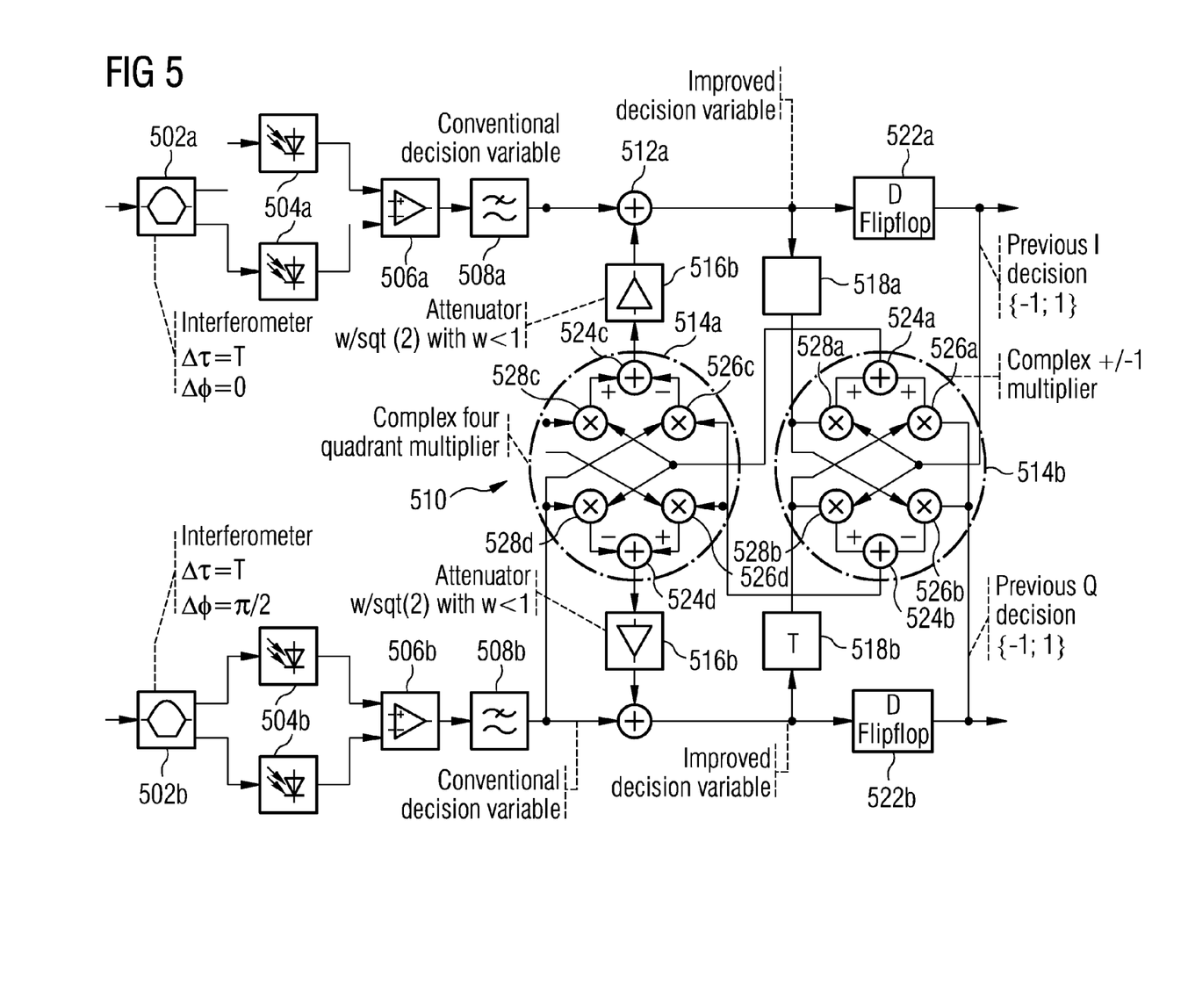
FIG. 5 illustrates a variant of the present invention.

Here now, we discuss the case for DQPSK illustrated in FIG. 5. Essentially, the invention above applies equally as well to the DQPSK. In other words, Equation (12) is applicable to the DQPSK case as well. Therefore, the DQPSK case is similar to the DBPSK case and includes similar components. As will be better understood below, for quaternary DPSK the decision feedback multi-symbol detection simplifies into:

$$x(nT+\tilde{t}) = u(nT+\tilde{t}) + w \cdot u(nT+\tilde{t}) \cdot x[(n-1)T+\tilde{t}] \cdot c^*(n-1) \quad (16)$$

wherein the complex number u(t) is representative of the electrical signal converted by the converter, the real number w is a weighting factor, the complex number c(n−1) is representative of the estimated previous data symbol, the complex number x(t) is the decision variable, and * denotes complex conjugation.

In FIG. 5 the received signal r(t) is split into two portions and sent through an optical receiver, the self-homodyne receiver of the present invention. In one aspect of the invention, the self-homodyne receiver is comprised of an interferometric discriminator. In DPSK where demodulation involves the input signal be split into its real and imaginary parts and, in the exemplary case shown, the receiver is comprised of the pair of interferometric discriminators shown 502a, b. The interferometers separate the respective real and imaginary parts according to the phase shift set.

Thereafter, the optical signal is converted into the electrical domain by, in this case, a pair of opto-electrical diodes 504a, and likewise 504b for the imaginary portion, and corresponding operational amplifier 506a, b. At this point, the real and imaginary parts are subjected to low-pass filtering using, for example, low pass filters 508a, b. Equation (12), as in the case of FIG. 4, is embodied in the electronic post-processing 510 provided between the low-pass filters and the decision devices. In the exemplary embodiment shown, the electronic post-processing 510 generates the second part of the expression in Equation (12) that is added to the decision variable u(t). Of course, other implementations embodying the processing may also be implemented.

To continue, an adder 512a, b adds the decision variable and the second part of expression (12) together in order to obtain the improved decision variable x(t). In general, a processor is provided that samples the decision variable u(t) and factors it by a previously generated improved decision variable. The sign of the factor is dependent on the previous decision. In the present invention, a complex multiplier 514a is provided, such as a complex four quadrant multiplier, in order to multiply the complex numbers. Since DQPSK employs quadranary complex numbers, a second complex multiplier 514b is employed. An attenuator 516a, b provides the forgetting, or weighting, factor w, to attenuate the effect of the electronic processing.

The time delayed version of the improved decision variable is provided by sampling the improved decision variable x(t) by a time delay T 518a, b. The sign of the delayed version of the decision variable x(t) is provided by the exponent factor exp[−jc(n−1)]. The time delayed version of the decision variable x(t) and the exponent factor are combined by a multiplier 520a, b before the complex multiplier 514. Here, multiplier 520a, b is shown as a +/−1 multiplier.

The improved decision variable is then sent to a decision device. The decision device in the exemplary apparatus shown in FIG. 5 are D flip flop 522a, 522b. Although, the decision device may be as simple as a switch or a more complex processor. Additional components utilized by the decision device, e.g., clock recovery, etc., are known and, therefore, have been omitted for clarity.

In the case of DQPSK, the complex multiplier 514b takes the place of multipliers 420a, b in FIG. 4. That is, complex multiplier 514b multiplies the complex form of x[(n−1)T] by exp[−jc(n−1)]. More particularly, adders 524 a, b add the factored expressions from multipliers 526a, 528a, and 526b, 528b. The complex result is fed to the complex multiplier 514a wherein the real part of the decision variable u(nT) is complex multiplied by multipliers 528c,d with the real part output of the complex multiplier 514b. The imaginary part of the complex output from complex multiplier 514b is fed to multipliers 526c,d, for multiplication with the imaginary part of the decision variable u(nT). The output of these multipliers is directed to the adders 524a, b, respectively. The weighting factor is then applied by attenuators 516a, b, respectively. The results are respectively added by adders 524 c, d.

It shall be appreciated that the implementations in FIGS. 4 and 5 are analog. Although, the implementation of (12) may be either analog or digital. In the digital case, the baud-spaced sampling may be set at $\tilde{t}=0$, for example. In the digital case the factor:

$$\exp[-jc(n-1)] \quad (17)$$

is realized on the base of the previously recovered bits. For DBPSK the factor corresponds directly to the previous bit decision interpreted in {−1; 1}; for DQPSK $$\exp[-jc(n-1)] = \frac{1}{\sqrt{2}}[b_I(n-1) - jb_Q(n-1)] \quad (18)$$

holds, where $b_I(n-1)$ and $b_Q(n-1)$ are the previous bit decisions interpreted in {−1; 1} for the in-phase and quadrature components, respectively. The scaling factor $\sqrt{2}$ can be combined with the forgetting factor w. The multiplication by the remaining factor is equivalent to a multiplication by ±1 for DBSPK and (±1±j) for DQPSK.

Figure 6:
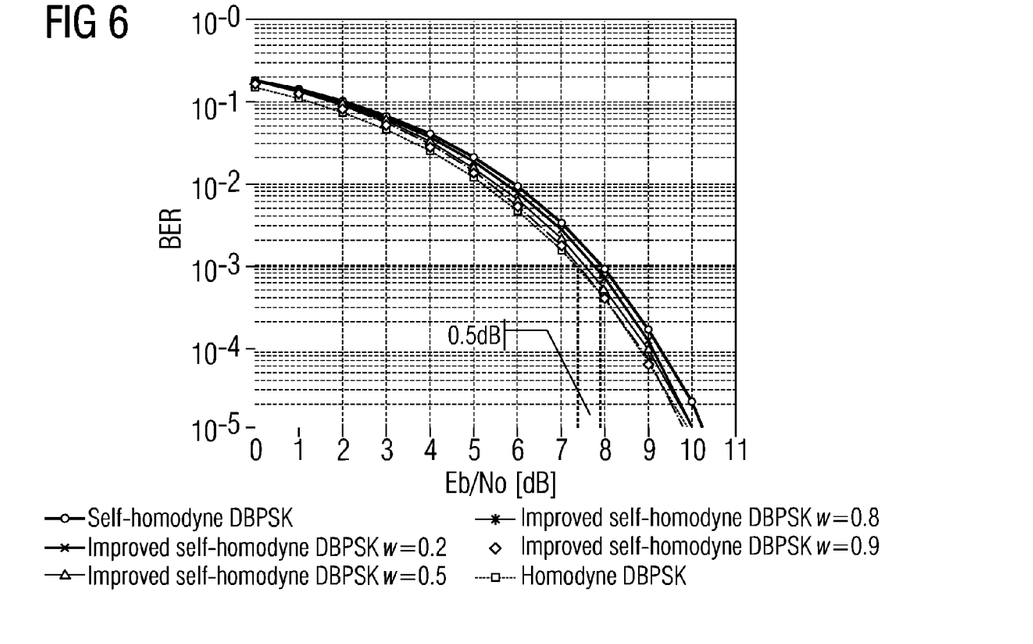
FIGS. 6 and 7 illustrate the simulation results over an AWGN channel for DBPSK and DQPSK, respectively.
Figure 7:
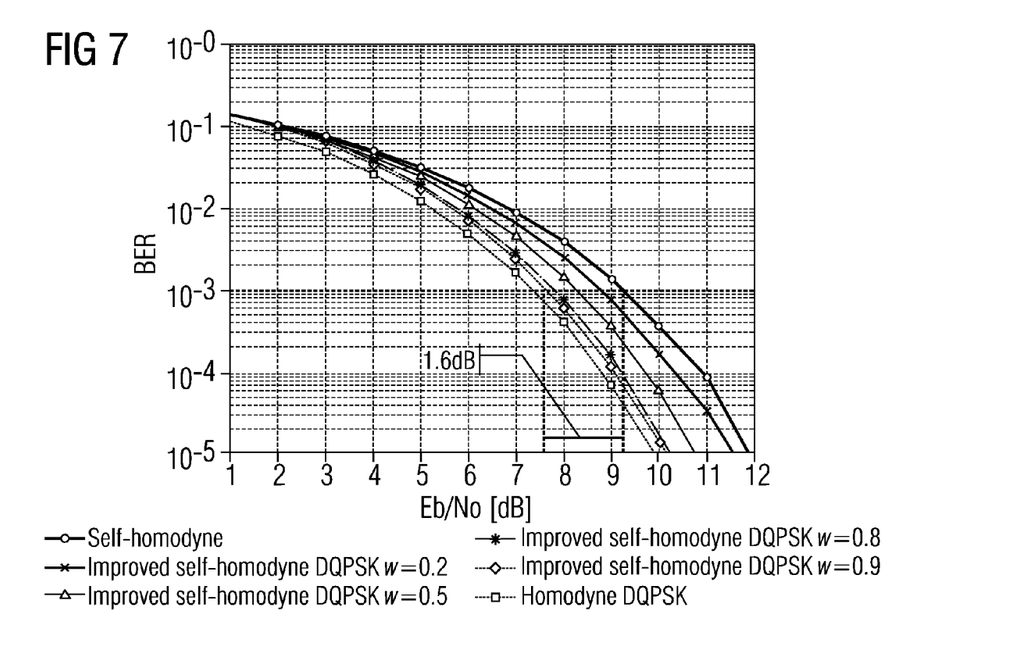

Now the operation of the invention shall be discussed with reference to FIG. 6 and FIG. 7, which summarize the simulation results over an AWGN channel for DBPSK and DQPSK, respectively. In particular, FIG. 6 illustrates the performance of the improved DBPSK demodulator on the AWGN channel for several values of the forgetting factor w. FIG. 7 shows the performance of the improved DQPSK demodulator on the AWGN channel for several values of the forgetting factor w. In more detail, there is plotted the bit error rate (BER) (abscissa) as a function of $E_b/N_0$ (coordinate), where $E_b$ is the energy per bit and $N_0/2$ is the two-sided power spectral density of the noise along each polarization. For simplicity's sake a matched filtering and Nyquist overall impulse response is assumed. As a reference, we include the curves corresponding to conventional self-homodyne and homodyne detection.

As can be seen from FIG. 6, when the forgetting factor grows from 0 to 1, the proposed demodulator moves from the performance of self-homodyne to that of homodyne detection. The gain respect to self-homodyne detection at BER=$10^{-3}$, which is relevant if a strong forward error correction (FEC) code is employed, amounts to 0.5 dB for DBPSK for w=0.9. In the case of DQPSK as shown in FIG. 7, the gain amounts to 1.6 dB for w=0.9. In contrast with the solution proposed by Lieb, we see that, for values of w that are close to 1, the results are much improved. This is due, in part to the avoidance in the present invention of a local oscillator. As will be appreciated, the forgetting factor is not limited by the effect illustrated with earlier reference to the prior literature.

Figure 8:
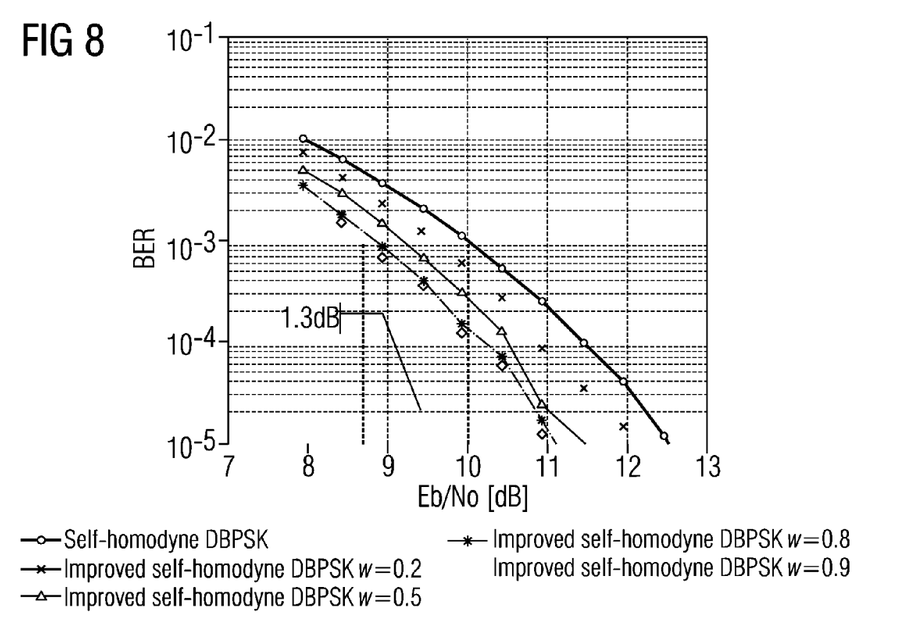
FIGS. 8 and 9 illustrate the simulation results for a single-channel multi-span system in the presence of self-phase non-linear phase noise for DBPSK and DQPSK, respectively.
Figure 9:
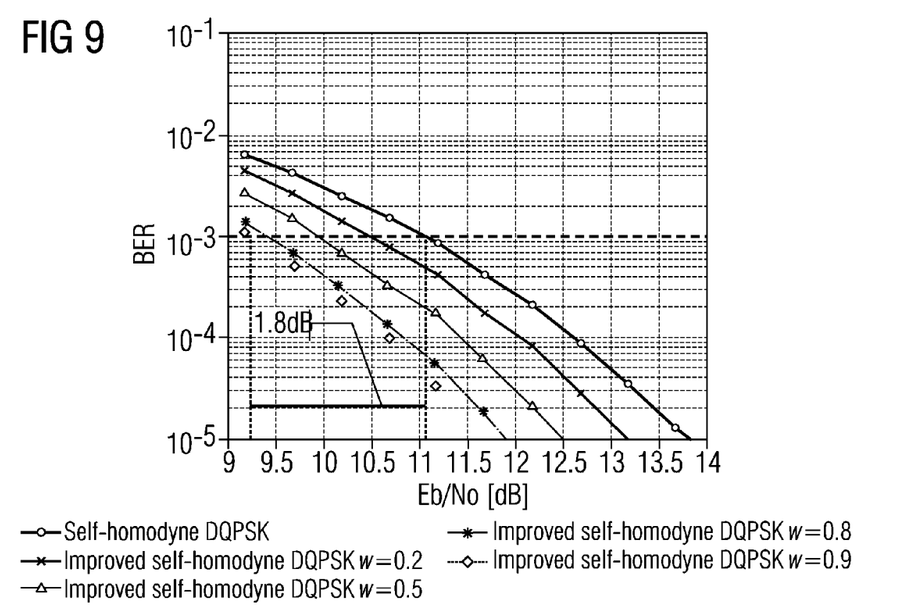

FIGS. 8 and 9 show the simulation results for a single-channel multi-span system in the presence of self-phase nonlinear phase noise for DBPSK and DQPSK, respectively. Following Gordon and Ho, dispersion effects have been neglected. In particular, FIG. 8 shows the performance of the improved DBPSK demodulator in case of self-phase nonlinear phase noise for several values of the forgetting factor w. The fiber parameters are: $\alpha=0.25$ dB/km, $\gamma=1.2993$ $W^{-1}km^{-1}$; Link parameters: span length=90 km, launch power=1 mW, number of spans=40.

FIG. 9 shows the performance of the improved DQPSK demodulator in case of self-phase nonlinear phase noise for several values of the forgetting factor w. The fiber parameters are: $\alpha=0.25$ dB/km, $\gamma=1.2993$ $W^{-1}km^{-1}$; Link parameters: span length=90 km, launch power=1 mW, number of spans=30.

From FIG. 8, it can be seen that in the case of DBPSK the gain respect to conventional homodyne demodulation amounts to 1.3 dB. A comparison of FIG. 6 and FIG. 8 reveals that respect to an idealized AWGN scenario, self-homodyne demodulation experiences a penalty of about 2.1 dB at $BER=10^{-3}$, whereas the proposed demodulator with w=0.9 suffers only from a penalty of 1.3 dB. It is concluded, therefore, that the proposed multi-symbol detection of the present invention can efficiently mitigate the effect of phase noise.

In the case of DQPSK shown in FIG. 9, the gain respect to self-homodyne demodulation is 1.8 dB, which is only slightly better than the gain over the AWGN channel. In this case the mitigation of the phase noise is less effective, due to the higher intrinsic sensitivity of the DQPSK modulation format to phase disturbances. However the absolute performance improvement respect to self-homodyne demodulation is still significantly higher than for DBPSK.

In summary, in combination with DBPSK the proposed method of the present invention offers a moderate SNR-gain over the AWGN channel and an efficient mitigation of phase noise respect to self-homodyne demodulation in a nonlinear scenario for demodulation of an optic signal. The trade-off SNR-gain vs. additional effort becomes particularly appealing in the presence of nonlinear phase noise, when self-homodyne detection suffers from significant degradation. Other known approaches for the mitigation of the phase noise, which have been discussed, are more complex and can only compensate for self-phase nonlinear phase noise. The proposed method, being agnostic with respect to the origin of the phase noise, can compensate cross-phase nonlinear phase noise and XPM-induced phase noise as well.

In conjunction with DQPSK the proposed method offers a significant SNR-gain over the AWGN channel respect to self-homodyne demodulation. In the presence of phase noise the novel multi-symbol demodulator performs well, even if it does not exhibit any additional significant benefit respect to the AWGN case.

In addition to these advantages, the invention utilizes relatively cheap electronics, as opposed to expensive optics. Thereby, the invention provides an efficient and uncomplicated solution to the previous problems of DPSK demodulation of an optical signal.

Although the present invention has been described with reference to particular embodiments, it shall be appreciated that the invention may be practiced with variations or modifications thereto with the spirit and scope of the present invention.

The invention claimed is:

1. An apparatus for demodulating an optical Differential Phase-Shift Keying (DPSK) signal, comprising:
    a self-homodyne receiver for receiving the optical signal;
    a converter for converting the optical signal received by the self-homodyne receiver into a representative electrical signal; and
    a processor that processes the representative electrical signal using decision feedback multi-symbol detection in order to obtain a decision variable that indicates a differential phase-shift in the optical signal, the decision feedback multi-symbol detection utilized by the processor being implemented according to the following equation:

$$x(nT+\tilde{t})=u(nT+\tilde{t})+w \cdot u(nT+\tilde{t}) \cdot x[(n-1)T+\tilde{t}] \cdot \exp[-jc(n-1)],$$

wherein the complex number u(t) is representative of the electrical signal converted by the converter, the real number w is a weighting factor, the complex number $\exp[-jc(n-1)]$ is representative of the estimated phase of the previous data symbol and the complex number x(t) is the decision variable.

2. The apparatus of claim 1, wherein the self-homodyne receiver consists of a pair of interferometers for receiving in-phase and quadrature components of the optical signal.

3. The apparatus of claim 1, wherein binary DPSK is adopted and the decision feedback multi-symbol detection simplifies into:

$$x(nT+\tilde{t})=u(nT+\tilde{t})+w \cdot u(nT+\tilde{t}) \cdot x[(n-1)T+\tilde{t}] \cdot c(n-1),$$

wherein the complex number u(t) is representative of the electrical signal converted by the converter, the real number w is a weighting factor, the real number c(n−1) is representative of the estimated previous data symbol and the real part of the complex number x(t) is the decision variable.

4. The apparatus of claim 1, wherein quaternary DPSK is adopted and the decision feedback multi-symbol detection simplifies into:

$$x(nT+\tilde{t})=u(nT+\tilde{t})+w \cdot u(nT+\tilde{t}) \cdot x[(n-1)T+\tilde{t}] \cdot c^*(n-1),$$

wherein the complex number u(t) is representative of the electrical signal converted by the converter, the real number w is a weighting factor, the complex number c(n−1) is representative of the estimated previous data symbol, the complex number x(t) is the decision variable, and * denotes complex conjugation.

5. The apparatus of claim 1, wherein further comprising a sampler for sampling the electrical signal converted by the converter and wherein the decision feedback multi-symbol detection is implemented in digital form.

6. A method for demodulating an optical Differential Phase-Shift Keying (DPSK) signal, comprising the steps of:
    receiving the optical signal using a self-homodyne receiver;
    converting the optical signal received by the self-homodyne receiver into a representative electrical signal; and
    processing the representative electrical signal using decision feedback multi-symbol detection in order to obtain a decision variable that indicates a differential phase-shift in the optical signal, wherein the decision feedback multi-symbol detection utilized in the step of processing follows the following equation:

$$x(nT+\tilde{t})=u(nT+\tilde{t})+w \cdot u(nT+\tilde{t}) \cdot x[(n-1)T+\tilde{t}] \cdot \exp[-jc(n-1)],$$

wherein the complex number u(t) is representative of the electrical signal converted by the converter, the real number w is a weighting factor, the complex number exp[jc(n−1)] is representative of the estimated phase of the previous data symbol and the complex number x(t) is the decision variable.

7. The method of claim 6, wherein the adopted modulation is differential binary phase-shift keying.

8. The method of claim 6, wherein the adopted modulation is quaternary differential phase-shift keying.

* * * * *